(No Model.)

I. L. CARR.
PORTABLE CHEMICAL FIRE EXTINGUISHER.

No. 524,377. Patented Aug. 14, 1894.

Witnesses:
John Grist
H. H. Hurley

Inventor:
Israel L. Carr.
By Henry Grist
Attorney.

THE NORRIS PETERS CO., PHOTO-LITHO., WASHINGTON, D. C.

UNITED STATES PATENT OFFICE.

ISRAEL LEWIS CARR, OF TORONTO, CANADA.

PORTABLE CHEMICAL FIRE-EXTINGUISHER.

SPECIFICATION forming part of Letters Patent No. 524,377, dated August 14, 1894.

Application filed October 31, 1892. Serial No. 450,567. (No model.) Patented in Canada June 14, 1892, No. 39,138.

*To all whom it may concern:*

Be it known that I, ISRAEL LEWIS CARR, a citizen of the United States, at present residing in the city of Toronto, in the Province of Ontario, in the Dominion of Canada, have invented certain new and useful Improvements in Portable Chemical Fire-Extinguishers, (for which I have received a patent of the Dominion of Canada, No. 39,138, dated June 14, 1892;) and I do hereby declare that the following is a full, clear, and exact description of the same, reference being had to the accompanying drawings, in which—

Figure 1:
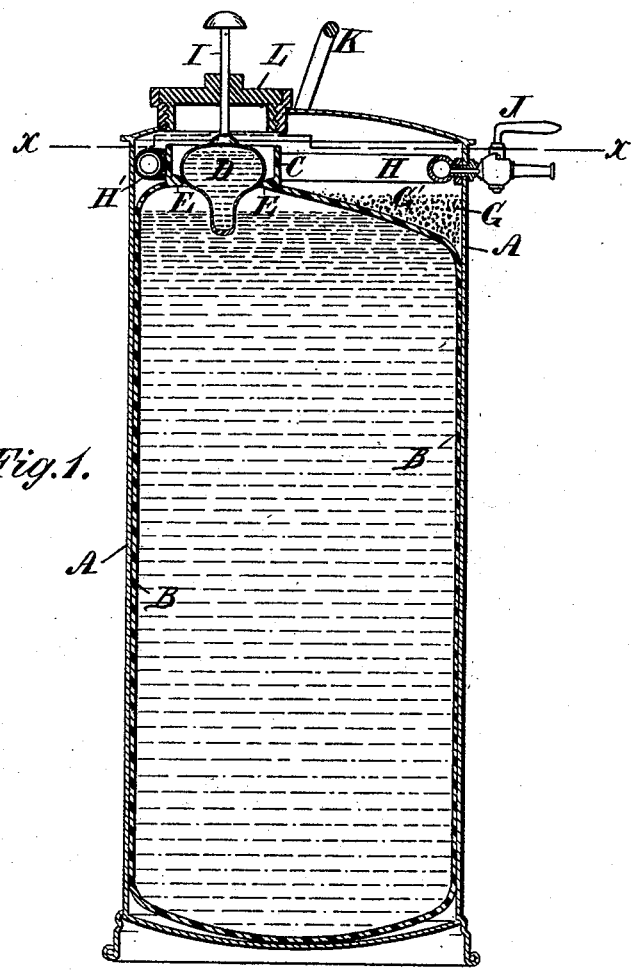
Figure 2:
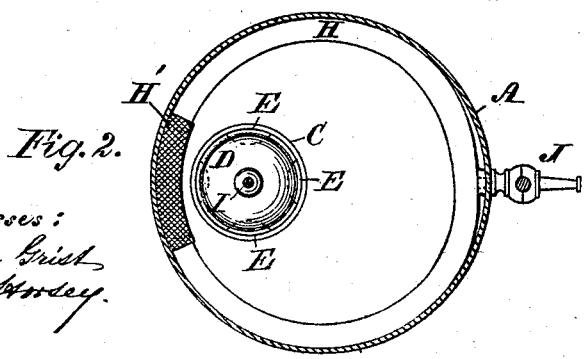

Figure 1, is a vertical section of my fire extinguisher, and Fig. 2, is a section on line X X.

My invention has for its objects to retain in the extinguisher all the gas generated by commingling the chemicals until all the liquid has been expelled under pressure of the gas; to prevent deterioration of the chemicals by keeping them separately in air-tight compartments, and to dispense with the requirement and use of a hose.

My invention consists in certain features of construction and combination of parts as will be hereinafter described and set forth in the claims.

A, is the outer cylindrical vessel or casing of the extinguisher inclosing a glass or non-corrosive metal flask B, containing a chemical fluid, and said flask has at top a neck C, eccentrically located to permit the flask to wholly decant its contents when the extinguisher is held in an inverted inclined position, as when in use. The neck C, is closed by a hollow glass bulb or stopper D, which contains an acid, and said stopper after being charged with the acid has the orifice hermetically sealed by fusing the glass. The stopper when inserted in the neck is cemented therein to prevent evaporation of the liquid in the flask and to prevent the stopper loosening. The neck C, has internally around the lower circumferential edge, projections or lugs E, against which the stopper bears, said projections facilitating breakage of the stopper into small pieces, to clear the neck, and prevent larger pieces stopping the outflow.

The vessel A, is longer than the flask B, and between the top of the vessel and the top of the flask is a divisional air-tight chamber G, in which is stored a dry chemical G', to preserve said chemical from being impaired by dampness, and be a mixing chamber for the chemicals in the generation of gas, and the neck C, of said flask discharges into said chamber when the extinguisher is inverted and the stopper D, broken for use. H, is a conduit within said chamber G, and preferably located around the circumference, and secured to the vessel A, for permanency, and said conduit near the neck C, has a perforated inlet or orifice covered by a strainer H'.

J, is the discharge cock of the extinguisher, said cock inserted through the wall of the vessel A, and connecting with the conduit H, at a point farthest from the inlet or strainer H', so that when the extinguisher is inverted for use and held inclinedly, and the stopper D, broken, the strainer will be submerged, and the gas generated by commingling the chemicals will rise into the flask B, and force the liquid therein through the neck C, chamber G, conduit H, and cock J, for extinguishing a fire, and said pressure or force will not be abated until the liquid in the chamber G, is exhausted, as the gas is prevented from escaping through the submerged strainer until the exhaustion of said chamber is effected. When the strainer H', is submerged, the liquid in chamber G, will stop off or seal the entrance to the conduit H, and prevent the escape of gas from the extinguisher, until the gas has driven out the liquid, so that none remains in said chamber as waste.

The discharge cock J, is located at a point farthest from the inlet to conveniently throw a stream upwardly, and while doing so, keep the inlet H', submerged, to prevent escape of gas.

In the top of the vessel A, directly over the stopper D, is a screw plug L, having a break pin I, so that by driving the pin by a blow of the hand, the stopper D, will be broken in small pieces, and the chemicals will commingle and start operation of the extinguisher, as described.

K, is a handle at the end of the vessel A, for holding and carrying the extinguisher when inverted or otherwise.

I claim as my invention—

1. In a portable chemical fire extinguisher, the combination of the flask B, containing a liquid and having a neck C, at one end eccentrically located, a hollow fragile stopper D, containing an acid and cemented in said neck, a vessel or casing A, inclosing said flask and stopper and having a plug L, provided with a break pin I, adapted to break said stopper, an air-tight chamber G, intervening the top of said vessel and flask and containing a dry chemical, a conduit H, within said chamber, said conduit having an inlet close to said neck and provided with a strainer H′, and an outlet cock J, in said conduit and at a point farthest from said neck and strainer and passing through the wall of said vessel, whereby the inlet to the conduit will be submerged when the extinguisher is inverted and the stopper broken, to prevent escape of gas generated by the commingling chemicals and the inlet to said conduit remains submerged until the gas has exhausted the extinguisher, as set forth.

2. In a fire extinguisher, the combination with the exterior vessel A, provided with a break pin I, of an interior flask B, provided with a hollow stopper D, a divisional chamber G, intervening the top of said vessel and flask, and a conduit H, within said chamber and provided with a discharge cock J, as set forth.

3. In a fire extinguisher, the combination of the flask B, having a neck C, the hollow fragile stopper D, cemented in said neck, and the exterior vessel A, having a divisional chamber G, at the top of said flask, for stowage of chemicals separately in air-tight compartments, to prevent deterioration, as set forth.

4. In a fire extinguisher, the combination with the exterior vessel A, having a break pin I, of the flask B, having a neck C, eccentrically located in the end, a hollow stopper D, inserted in said neck, and a conduit H, in a chamber G, intervening the top of said vessel and flask, and provided with a discharge cock J, as set forth.

5. The combination of the vessel A, having a break pin I, the flask B, having an eccentrically located neck C, provided with lugs E, the hollow stopper D, seated against said lugs, a chamber G, intervening the top of said flask and vessel A, said chamber containing a dry chemical G′, and the conduit H, within said chamber, through which conduit the chemical fluid is discharged by the pressure of gas, as set forth.

ISRAEL LEWIS CARR.

Witnesses:
HENRY GRIST,
JOHN GRIST.